Sept. 2, 1958  A. KRAVITS  2,849,997
FUEL INJECTION PUMPS FOR INTERNAL COMBUSTION ENGINES
Filed Sept. 10, 1954  12 Sheets-Sheet 3

INVENTOR.
ARTHUR KRAVITS
BY
Robert H. Jacob
AGENT

Sept. 2, 1958 A. KRAVITS 2,849,997
FUEL INJECTION PUMPS FOR INTERNAL COMBUSTION ENGINES
Filed Sept. 10, 1954 12 Sheets-Sheet 4

INVENTOR.
ARTHUR KRAVITS
BY
Robert H. Jacob
AGENT

Sept. 2, 1958 A. KRAVITS 2,849,997
FUEL INJECTION PUMPS FOR INTERNAL COMBUSTION ENGINES
Filed Sept. 10, 1954 12 Sheets-Sheet 5

INVENTOR.
ARTHUR KRAVITS
BY
Robert H. Jacob
AGENT

Sept. 2, 1958      A. KRAVITS      2,849,997

FUEL INJECTION PUMPS FOR INTERNAL COMBUSTION ENGINES

Filed Sept. 10, 1954      12 Sheets-Sheet 6

INVENTOR.
ARTHUR KRAVITS
BY
Robert H. Jacob
AGENT

Sept. 2, 1958 A. KRAVITS 2,849,997
FUEL INJECTION PUMPS FOR INTERNAL COMBUSTION ENGINES
Filed Sept. 10, 1954 12 Sheets-Sheet 8

INVENTOR.
ARTHUR KRAVITS
BY
Robert H. Jacob
AGENT.

Sept. 2, 1958 A. KRAVITS 2,849,997
FUEL INJECTION PUMPS FOR INTERNAL COMBUSTION ENGINES
Filed Sept. 10, 1954 12 Sheets-Sheet 11

INVENTOR.
ARTHUR KRAVITS
BY
Robert H. Jacob
AGENT

Sept. 2, 1958 A. KRAVITS 2,849,997
FUEL INJECTION PUMPS FOR INTERNAL COMBUSTION ENGINES
Filed Sept. 10, 1954 12 Sheets-Sheet 12

INVENTOR.
ARTHUR KRAVITS
BY
Robert R. Jacob.
AGENT

United States Patent Office 2,849,997
Patented Sept. 2, 1958

2,849,997

FUEL INJECTION PUMPS FOR INTERNAL COMBUSTION ENGINES

Arthur Kravits, Budapest, Hungary, assignor to "Licencia" Talalmany-okat Ertekesito Vallalat, Budapest, Hungary, a Hungarian enterprise Application September 10, 1954, Serial No. 455,143

17 Claims. (Cl. 123—139)

The present invention relates to fuel injection pumps for internal combustion engines of the type having a pump barrel and a pump plunger arranged therein and enclosing a work chamber therewith between a fuel supply means and a fuel delivery means. Cam means are provided for positively driving the pump plunger so as to create a pressure in the delivery means needed for injecting an amount of fuel into the internal combustion engine.

With such fuel injection pumps hitherto known the adjustment of the fuel delivery associated with the full load of the internal combustion engine at a predetermined number of revolutions thereof to a preselected value has so far been effected by affecting the conditions prevailing in the work chamber during the compression stroke of the pump plunger and before its extreme position associated with the end of the compression stroke. However, the pressures prevailing in the work chambers of such fuel injection pumps being very high, the above described method of control requires high accuracy as regards machining the mutually sliding surfaces of associated pump barrels and pump plungers which, on one hand, have to form a seal for the high fuel pressures and, on the other hand, are exposed to high strains in operation. Thus, their life-time is relatively short. The control per se being rather cumbersome the fuel injection pump has to be set with high accuracy.

The main object of the present invention consists in eliminating the above said drawbacks and providing a fuel injection pump for internal combustion engines of simple construction, reliable operation and long life-time. The present invention is based upon the discovery that the fuel delivery can—in contradistinction to the above described known system—be controlled by adjusting the delivery means rather than by affecting the conditions prevailing in the work chamber. This is, in compliance with the main feature of the present invention, obtainable by applying control means for reducing the fuel pressure prevailing in the delivery means during displacement of the pump plunger towards the supply means so as to adjust the fuel delivery associated with the full load of the internal combustion engine at a predetermined number of revolutions thereof to a preselected value.

The new fuel injection pump may utilize longer sliding surfaces than heretofore provided and thereby reduce the machining accuracy required for providing reliable sealing properties. Also the life-time of the new fuel injection pump is increased thereby since its components are exposed to relatively smaller strains. Since the new fuel injection pump is controlled by means other than the work chamber the structure is rendered relatively more simple and reliable and is cheaper to manufacture.

Another object of the present invention consists in improving the displacement of air from the work chamber by decreasing its cylinder clearance.

A further object of the present invention consists in having the adjustment of the fuel delivery rendered dependent on the number of revolutions of the internal combustion engine.

Still another object of the present invention consists in preventing pressure reaction among the work chambers of individual pump elements of a gang of such elements through their common supply means.

A still further object of the present invention consists in providing means for reducing the pressure exerted by the pump plunger on the cam means so as to decrease its load during a considerable portion of one cycle of injection.

Still another object of the present invention is to provide a new and improved fuel injection pump in which the pump is adjustable while the internal combustion engine is running.

A still further object of the present invention consists in providing means for preventing unintentional adjustment of individual pump elements of a gang of such elements.

Further objects and features of the present invention will be described by taking reference to the accompanying drawings which show, by way of example, several embodiments thereof. In the drawings.

Like parts are referred to by the same reference numerals throughout the drawings.

Figure 1:
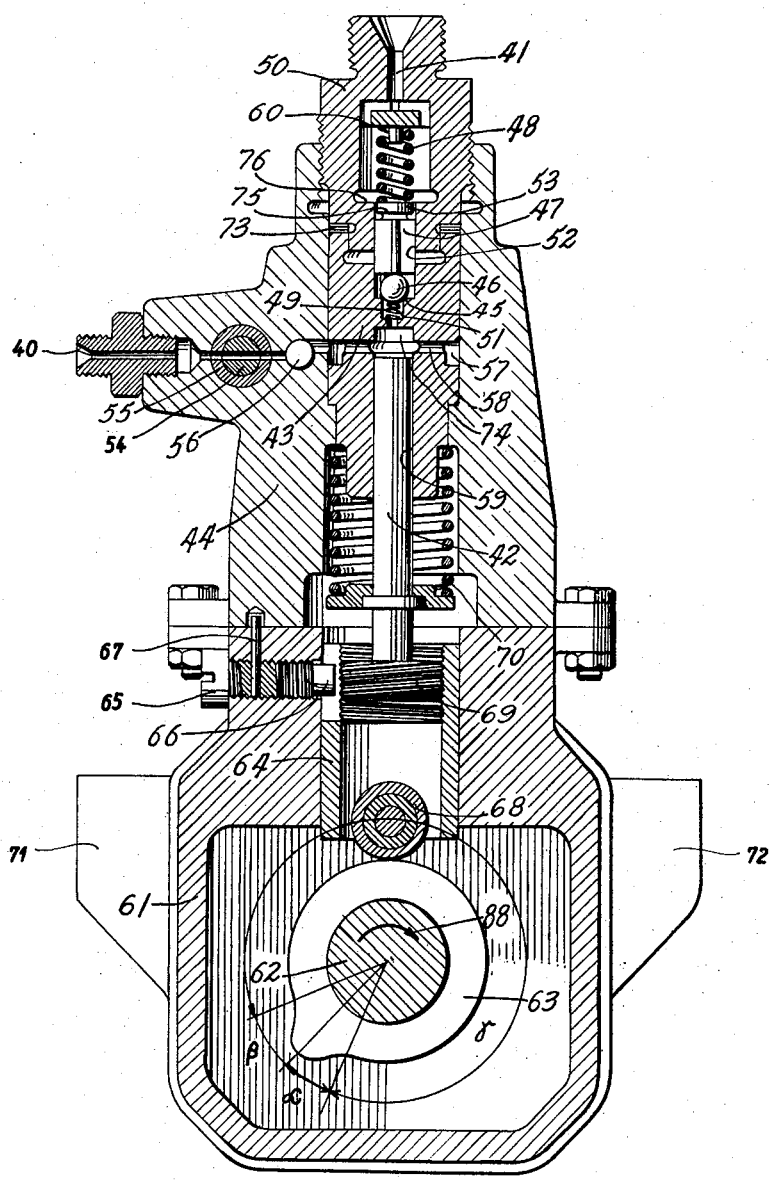
Fig. 1 is a sectional view of one embodiment.

Referring to the drawings, Fig. 1 shows a fuel injection pump designed for a four-cylinder internal combustion engine. The fuel injection pump is provided with a supply means 40 and a delivery means 41 and has a pump plunger 42 arranged therebetween. The latter is slidably arranged within a pump barrel 43 which is snugly fitting in a bore of an upper portion 44 of the pump housing. The upper portion of the pump barrel 43 is formed so as to serve as the seat of a compression valve means functioning as a back pressure valve and consisting of a system of a ball valve 46 and a check valve 47, the members of this system being urged by compression springs 48 and 49 so as to bear against one another. The compression spring 48 is selected so as to overwhelm the action of the compression spring 49. It bears against a closure means 50 threadedly engaged with the upper portion 44 of the pump housing, the closure means 50 serving also for fixing the mutual position of the pump barrel 43 and the upper portion 44 of the pump housing. The compression spring 49 bears against the bottom of a bore 51 of the pump barrel 43. Being less strong than the compression spring 48 it serves only for steadily maintaining the contacting relationship between the ball valve 46 and the check valve 47. The check valve 47 is slidably fitting in a bore 52 of the closure means 50 which forms the guide means thereof, both valves 46 and 47 forming together the compression valve means 46, 47 inserted between the pump plunger 42 and the delivery means 41. The head member of the check valve 47 of the compression valve means 46, 47 is referred to by reference numeral 53 and adapted to throttle the flow of fuel through the guide means 52.

The fuel is introduced from the supply means 40 through a throttle slider 54 rotatably arranged in a cylindrical member 55 and connectable to a not represented check valve arranged in the suction line of an internal combustion engine. From the throttle slider 54 the fuel flows into an oil gallery 56 and therefrom into an annular distribution chamber 57 which communicates by means of radial passages 58 with the interior 59 of the pump barrel 43. The fuel is discharged towards the delivery means 41 through passages 60 formed in the closure means 50.

The top portion 44 of the pump housing has a bottom portion 61 fixed to it which serves as a support of a cam shaft 62. A cam means 63 supported by the cam shaft 62 serves for positively displacing the pump plunger 42 towards the delivery means 41 upon rotation of the cam shaft 62.

The driving connection between the cam means 63 and the pump plunger 42 comprises tappet means comprising a cylindrical sleeve member 64 of which is slidably arranged in a bore of the bottom portion 61 of the pump housing, the angular position of the tappet means being fixed by a screw member 65 the head 66 of which engages with an axial slot of the sleeve member 64. The axial position of the screw member 65 is locked by a bolt means 67 supported by the bottom portion 61 of the pump housing. A roller 68 supported by the sleeve member 64 is in operational engagement with the cam means 63, the sleeve member 64 proper being in threaded engagement with a screw threaded abutment means 69. A compression spring 70 urges the pump plunger 42 to bear against the abutment means 69.

The cam means 63 comprising a suction portion $\alpha$ associated with supplying an amount of fuel from the supply means 40 and a pression portion $\beta$ associated with displacing an amount of fuel to the delivery means 41. Both portions $\alpha$ and $\beta$ are separated from one another by a bottom portion $\gamma$ of constant radius.

Brackets 71 and 72 serve for fixing the fuel injection pump on the cylinder block of an internal combustion engine.

With the represented embodiment the reduction of the fuel pressure prevailing in the delivery means 41 is, according to a further feature of the present invention, effected by retarding the cut-off motion of the compression valve means 46, 47 which is enabled to return to its seat 45 only when the pressure prevailing therebelow relaxes. This occurs only with the return motion of the pump plunger 42, i. e., during its displacement towards the supply means 40. As the pressure prevailing below the compression valve means 46, 47 relaxes the fuel amount being present thereabove is allowed to flow back. This flowing back of fuel towards the supply means 40 lasts till the returning compression valve means 46, 47 again closes, by means of its head member 53, arranged within the passage in the valve guide means 52. Obviously, the return motion of the compression valve means 46, 47 and thereby the period of delay of its cut-off motion is affected by the flowing fuel and depends on the extreme positions of the head member 53 with respect to the guide means 52. Thus, also the reduction of the pressure prevailing in the delivery means 41 is determined thereby.

Adjustment of the period of delay of the compression valve means 46, 47 and thereby of the reduction of the fuel pressure prevailing in the delivery means 41 is rendered possible by control means adapted to shift the axial position of the guide means 52 and thereby the extreme position of the head member 53 with respect thereto. With the represented embodiment this control means consists of annular inserts 73 accommodated between the pump barrel 43 and the closure means 50. The number as well as the thickness of the annular inserts 73 are selected so as to adjust the extreme positions of the head member 53 with respect to the guide means 52 to the desired value.

By increasing the thickness of the stack of the annular inserts 73 the extreme positions of the head member 53 with respect to the guide means 52 become shifted so as to result in an increased delay in the cut-off motion of the compression valve means 46, 47 and thereby an increased reduction in the pressure prevailing in the delivery means 41. The fuel delivery is decreased thereby since a larger portion thereof than formerly is needed for filling up the delivery means 41 so as to create the injection pressure therein.

If, however, the thickness of the stack of the annular inserts 73 is decreased, the conditions are reversed: delay and reduction become less so that in consequence of the decrease of the fuel amount needed for filling up the delivery means 41 so as to create the injection pressure therein the fuel delivery increases.

In operation, the extreme positions of the head member 53 are adjusted in the above described manner so as to correspond to the desired fuel delivery. The supply means 40 is connected to a feed pump (not shown) whereas the delivery means 41 is connected to an injection valve (not shown) of the fuel system of the internal combustion engine. The cam means 62 is in driving connection with the internal combustion engine through gear means (not shown). With the pump plunger 42 travelling towards its bottom extreme position, an amount of fuel is introduced through the supply means 40 so as to be discharged when the pump plunger 42 travels in the opposite direction, through the compression valve means 46, 47 into the injection valve (not shown). The ball valve means 46 is lifted thereby from its seat 45 and the head member 53 emerges from the valve guide means 52 so as to open the passage within the valve guide means 52 for the flow of fuel. As soon as the pump plunger 42 has reached its top extreme position, i. e. has performed its compression stroke, the pressure prevailing below the compression valve means 46, 47 reduces and thus the overwhelming action of the compression spring 48 urges the compression valve means 46, 47 to return to its seat 45. As long as the pump plunger 42 stays in its top extreme position, the compression valve means 46, 47 may return to its seat 45 only if a corresponding amount of the fuel withdraws from below the head member 53 towards the delivery means 41 and thereby clears the space needed by the head member 53 within the valve guide means 52. Meanwhile the pump plunger 42 starts with its suction stroke so that a depression is created thereabove that promotes the back flow of the fuel from the delivery means 41 towards the supply means 40. The time at which the passage of fuel through valve guide means 52 is cut off depends on the extreme positions of the head member 53 with respect to the valve guide means 52.

If the head member 53 is arranged within the valve guide means 52 with a close sliding fit the passage therethrough is closed when the bottom edge 75 of the head member 53 is in flushed relationship with the bottom surface 76 of the closure means 50. In such cases the volume of the fuel corresponding to the reduction of the pressure prevailing in the delivery means 41 equals the volume difference between the initial and final volume values of the work chamber.

If, in contradistinction, the head member 53 is arranged in the valve guide means 52 in space relationship thereto, the return motion of the compression valve means 46 and the head member 53 after the edge 75 of head member 53 has been flush with the bottom surface 76, causes but a throttling rather than a shutting off of the passage within the valve guide means 52 whereby the shut-off motion of the compression valve means 46, 47 is delayed less than was the case with the previously described close sliding fit of the head member 53. Thus, if the pump plunger 42 reaches its bottom extreme position, according to the extreme position of the head member 53 with respect to the valve guide means 52 more or less fuel will have been returned from the delivery means 41 below the valve means 46, 47. In consequence hereof, with the next compression stroke more or less fuel is needed to fill up the delivery means 41 to reach the value of the injection pressure and also the fuel delivery corresponds thereto. Moreover, by such an arrangement the fuel delivery is rendered dependent on the speed of the internal combustion engine as will hereinafter be described in closer details.

Should the fuel delivery associated with the full load of the internal combustion engine be altered, the closure means 50 will be screwed out from the upper portion 41 of the pump housing so as to have the annular inserts 73 rendered accessible. By increasing or decreasing the thickness of the stack of the annular inserts 73 the extreme positions of the valve means 46, 47 and in particular of the head member 53 will be varied with respect to the valve guide means 52. By varying the extreme position of valve means 46, 47 the throttling effect of valve means 46, 47 occurs earlier or later during the valve operation. In other words, the portion of the length of stroke of the head member 53 associated with the valve guide means 52 becomes longer or shorter whereby the opening and closing path length of the compression valve means 46, 47 is rendered longer and shorter, respectively, and the shut-off motion thereof more or less retarded, and vice versa. The new setting of the compression valve means 46, 47 entails also an alteration of the reduction of the pressure prevailing in the delivery means 41 whereby the fuel delivery associated with the full load of the internal combustion engine will be decreased or increased in the desired manner.

Figure 2:
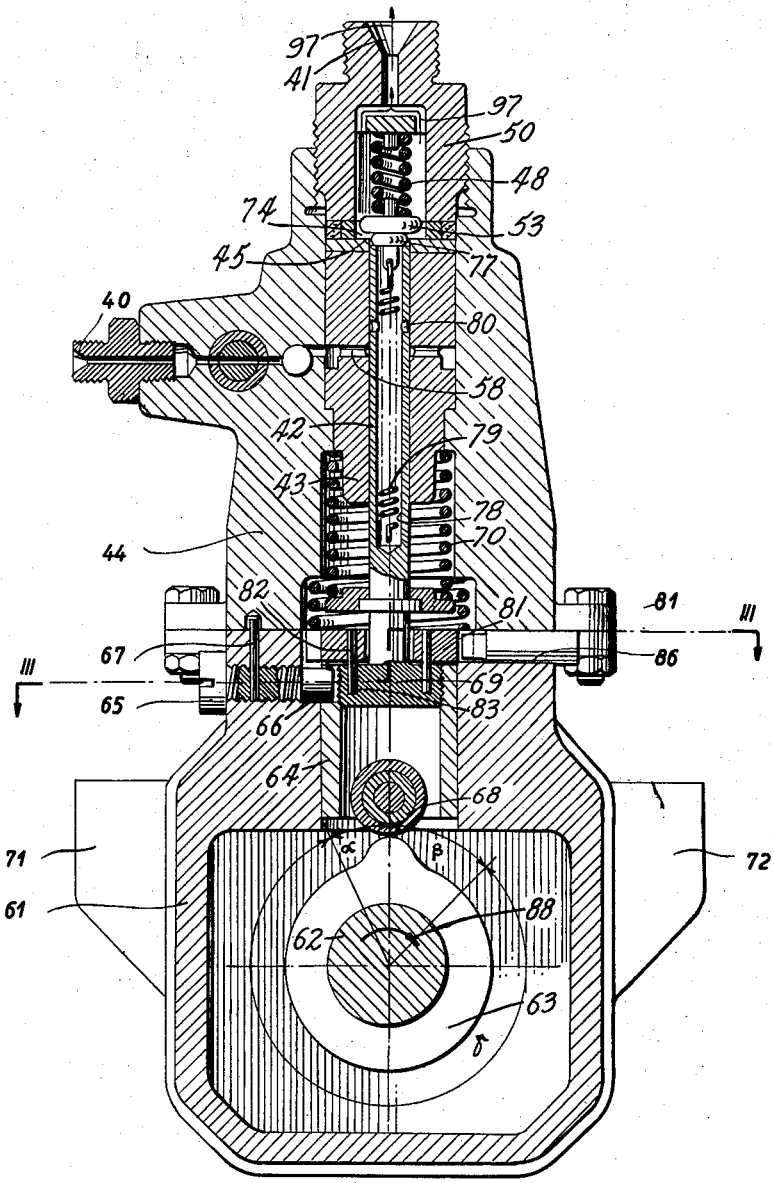
Fig. 2 shows a like sectional view of another embodiment.
Figure 3:
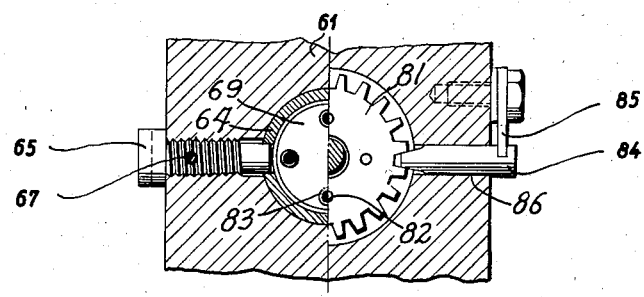
Fig. 3 represents a sectional view taken along the line III—III of Fig. 2.
Figure 4:
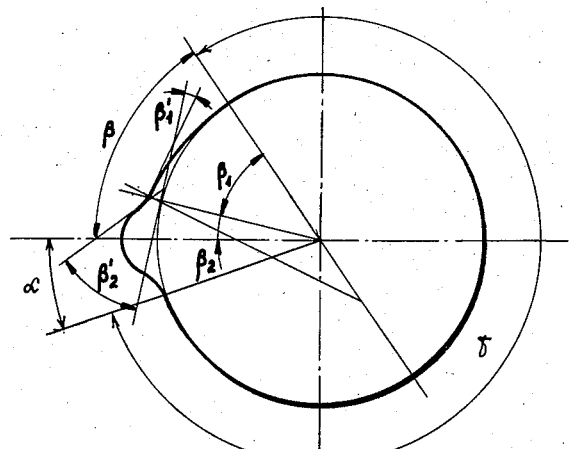
Fig. 4 illustrates a detail of Fig. 2 at a relatively larger scale.

Figs. 2 to 4 illustrate a modification of the compression valve means of Fig. 1 wherein the head member is a flat disk performing the same function as the head member 53 of the previous embodiment. With the represented embodiment the pump plunger 42 is formed as a hollow body having a chamber 78 adapted to be closed by a suction valve means 77. Thus, the work chamber 74 of the fuel injection pump is enclosed towards the supply means 40 by the suction valve means 77 and towards the delivery means 41 by the compression valve means 53. An extension spring 79 anchored to the bottom of the chamber 78 urges the suction valve means 77 to occupy its closing position. The pump plunger 42 is provided with passages 80 adapted to register with the supply passages 58 by means of which the chamber 78 is communicable with the supply means 40 for receiving an amount of fuel therefrom. The suction valve means 77 is arranged to control the flow of fuel in its passage from the chamber 78 of the pump plunger 42 to the work chamber 74 of the fuel injection pump.

With the represented embodiment the fuel injection pump is arranged to be associated with a four cylinder internal combustion engine. Thus, the cam means 63 is subdivided into sections each comprising a suction portion α associated with supplying an amount of fuel from the supply means 40 and a compression portion β associated with displacing an amount of fuel into the adjacent delivery means 41, the compression portion β being separated from the suction portion α by a bottom portion γ. In order to retard the shut-off motion of the compression valve means 53 and thereby to reduce the pressure prevailing in the delivery means 41 control means are provided to adjust the extreme positions of the pump plunger 42 with respect to the pump barrel 43. This type of adjustment causes the pump plunger 42 in its extreme position adjacent to the delivery means 41 to bear with the suction valve means 77 against and hold the compression valve means 53 in a lifted position. Thus, the compression valve means 53 is allowed to return to its seat 45 only during the displacement of the pump plunger 42 towards the supply means 40. This means that the shut-off motion of the compression valve means is delayed until the suction stroke of the pump plunger 42 entailing thereby a predetermined reduction of the pressure prevailing in the delivery means 41.

In order to displace the air from the work chamber 78 and to decrease its cylinder clearance the suction valve means 77 and the compression valve means 53 are provided with flat bearing surfaces facing one another so that, in the lifted position of the compression valve means 53, the suction valve means 77 bears with its flat bearing surface against the flat bottom surface of the former as shown in Fig. 2. In order to prevent the suction valve means 77 from adhering to the compression valve means 53 at least one of the bearing surfaces may have a slight curvature (not shown). Further adjustment of the compression reduction in the delivery means 41 after the pump plunger 42 has occupied its top extreme position may be obtained in compliance with a still further feature of the invention by providing a control means for adjusting the extreme positions of the pump plunger 42 with respect to the pump barrel 43.

With fuel injection pumps having their pump plunger 42 driven by tappet means 64, 69, the adjustment of the extreme positions of the pump plunger 42 is rendered possible by applying tappet means of adjustable axial length. Control means are adapted to be operated from without and to adjust the axial length of the tappet means and thereby to shift the extreme positions of the pump plunger 42 with respect to the pump barrel 43.

With the represented embodiment the aforementioned control means is formed by a pinion 81 coaxially arranged with the threaded abutment means 69 and provided with pins 82 fixed therein by location fit. The pins 82 engage with normal running fit with bores 83 of the threaded abutment means 69 whereby rotation of the pinion 81 entails also a corresponding rotation of the threaded abutment means 69. The angular position of the tappet means 64, 69 is fixed by the head 66 of the screw member 65 so that with rotation of the pinion 81 a mutual rotation of the sleeve 64 and the threaded abutment means 69 shall take place. According to the direction of this mutual rotation the threaded abutment means 69 penetrates more or less into the sleeve 64 whereby also an adjustment of the axial length of the tappet means 64, 69 is obtained. The angular position of the pinion 81 is fixed by means of a pin 84 accommodated within a groove 86 of the bottom portion 61 of the pump housing. The tooth-like point of the pin 84 is adapted to engage with the clearings of the pinion 81. Pin 84 is prevented from falling out by a bolt 85 illustrated in Fig. 3.

In operation, with the pump plunger 42 travelling downwards from its represented top extreme position, i. e. towards the supply means 40, the compression valve means 53 is allowed to return to its seat 45. When the pump plunger is moving upwards, the compression valve means 53 becomes lifted from its seat 45 under the action of the increasing fuel pressure prevailing in the work chamber 74 and stays lifted as long as the fuel injection is carried out. Normally valve means 53 would immediately return to its seat 45, however, the pump plunger 42 has been moved to its top extreme position in which the normally closed suction valve means 77 bears against the compression valve means 53 from below whereby the latter is retained in its lifted position. By suction valve means 77 bearing against valve means 53 the work chamber 78 of the fuel injection pump becomes thoroughly evacuated. The cylinder clearance of the work chamber 78 comprises the slack of the suction valve means 77 within the pump barrel 43 and the slight space between the slightly curved facing surfaces of the valve means 53 and 77.

Thus, the full delivery of the fuel injection pump is determined by the extent to which valve means 53 is lifted. The greater this lift, the more the fuel pressure prevailing in the delivery means 41 is reduced during displacement of the pump plunger 42 towards the supply means 40 and the more fuel is needed for filling up the delivery means 41 to obtain the pressure value at which the injection takes place.

If the pressure reduction and consequently the lift of the pressure valve means 53 is to be altered the bolt 85 will be disengaged with the pin 84 and the latter removed whereupon the pinion 81 will, by means of a suitable tool, e. g. a screw driver, put through the bore 86, be rotated in the desired direction. The threaded abutment means 69 will be rotated by pins 82 and also the sleeve 64 threaded to abutment means 69. In dependence on the direction of this mutual rotation the axial length of the tappet means 64, 69 is rendered shorter or longer. Obviously, the alteration of the axial length of the tappet means 64, 69 entails also a corresponding alteration of the extent to which the compression valve means 53 is lifted and thereby an alteration of the reduction of the fuel pressure prevailing in the delivery means 41 during displacement of the pump plunger 42 towards the supply means 40. With the new value of the pressure reduction the full delivery of the fuel injection pump i. e. its fuel delivery associated with the full load of the internal combustion engine is adjusted to the desired value.

The fuel injection pumps hitherto known are also affected with the considerable drawback that the fuel delivery decreases with lowering of the number of revolutions and thus the internal combustion engines provided with such fuel injection pumps offer small torques at low number of revolutions. This is disadvantageous particularly with vehicle engines where at starting and accelerating greater torques would be desirable. Attempts have been made to construct fuel injection pumps in which the fuel delivery associated with the full load of the engines is constant and independent from the engine speeds. The result of such endeavours has, however, been not wholly satisfactory since the fuel delivery and thereby also the torque of the engines decreases with the lowering of the number of revolutions even with the latest types of such fuel injection pumps.

The above described adjustment of the fuel delivery of the fuel injection pump by means of adjustably reducing the pressure prevailing in the delivery means offers the advantage of a simple possibility of having the fuel delivery associated with full loads rendered adjustable in dependance on the number of revolutions in such a manner that in the area of lower speeds of the internal combustion engines an increased amount of fuel is supplied and the torque of the engines increased. This system is in accordance with fuel injection pumps in which the fuel delivery associated with partial loads is adjusted by means of throttling and an increasing amount of fuel is delivered with lowering speeds.

Figure 5:
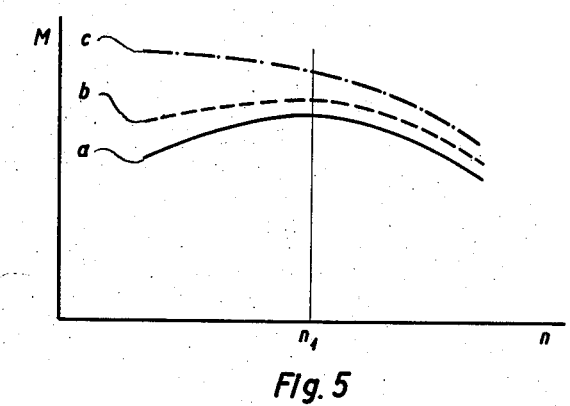
Fig. 5 is a diagram in which the number of revolutions of various internal combustion engines is plotted against the torque thereof.

The conditions are illustrated in Fig. 5 in which the number $n$ of revolutions are plotted versus the respective torques M. The curve $a$ of solid line represents the alteration of the torque M of internal combustion engines provided with known injection pumps at various numbers $n$ of revolutions. Obviously, in the area of low speeds, about below the value $n_1$, the torque M decreases towards the low numbers $n$ of revolutions. The curve $b$ of dotted lines represents the mutual behaviour of the torque M and the number $n$ of revolutions in case of known fuel injection pumps designed in the above described manner to deliver a constant amount of fuel independently from the speed of the engine. As is obvious from the diagram, the curve $b$ also drops though slightly towards the area of low speeds. The curve $c$ of dot-dash lines represents the dependance of the torque M on the number $n$ of revolutions in case of the fuel injection pumps of the present invention. As is clear from the diagram the torque is greater the lower the speed of the engine.

This favourable feature of the new fuel injection pumps is obtained by having the pressure prevailing in the work chamber of the fuel injection pump controlled by at least one throttle valve means. This feature is particularly significant in case of vehicle engines where the pressure regulation in compliance with the present invention offers the possibility of a relatively greater torque at starting and thereby an increased acceleration of the vehicle. Having the adjustment of the fuel delivery rendered dependant on the speed work conditions and loads of the engine results in considerable fuel savings since with increasing speed the fuel delivery decreases. That is a further advantageous feature of the present invention.

By reducing the pressure prevailing in the delivery means 41 by delaying the shut-off motion of the compression valve means 46, 47 (provided with a head member 53 for throttling the passage of fuel through a valve guide means 52), as represented in Fig. 1, the adjustment of the full delivery of the fuel injection pump can be rendered dependant on the speed of the internal combustion engine. In compliance with a further feature of the invention, head member 53 may be formed so as to be in spaced relationship with respect to the valve guide means 52.

Such an embodiment of the new fuel injection pump is shown in Figs. 6 to 13. This embodiment corresponds in every detail to that illustrated in Fig. 1, however, with the difference that the head member 53 is, in compliance with the feature of the invention just discussed, in spaced relationship with respect to the valve guide means 52 by an interstice 87 as is clear particularly from Fig. 10.

Figure 6:
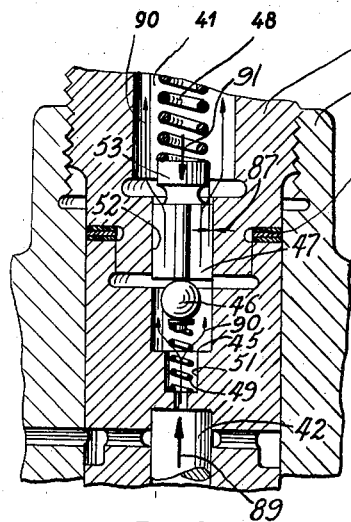
Figs. 6 to 13 show various operational positions of an improved embodiment of the fuel injection pump shown in Fig. 1.
Figure 7:
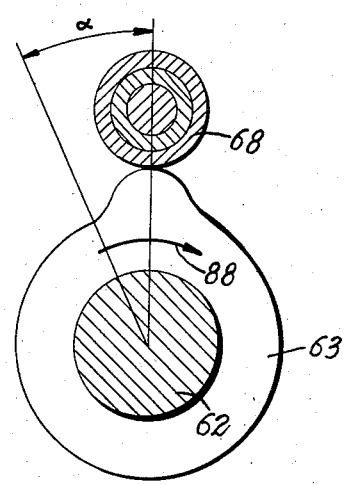

The fuel delivery is rendered dependant on the speed of the engine as follows:

In the operational position shown in Figs. 6 and 7 the roller 68 of the tappet means (not shown) occupies a position at the beginning of the suction portion $\alpha$ of the cam means 63 rotating in the direction of an arrow 88. The pump plunger has, in the direction of an arrow 89, arrived in its top extreme position. The fuel is thereby displaced first in the direction of an arrow 90 into the bore 51 and therefrom by means of lifting the compression valve means 46, 47 from its seat 45 through the free passage of the valve guide means 52 discharged into the delivery means 41 and injected. Thereafter, the fuel ceases to flow in the direction of the arrow 90 and the pressure prevailing in the compression valve means 46, 47 becomes relieved so that the compression valve means 46, 47 is urged by the compression spring 48 to return in the direction of an arrow 91 to its seat 45. For the time being, however, the pump plunger stays in its top extreme position so that the compression valve means 46, 47 is allowed to approach its seat 45 only to an extent to which the fuel present below the head member 53 withdraws through the annular interstice 87 into the delivery means 41. The greater the annular interstice 87 and the stronger the compression spring 48 the greater is the rate of both the flow of fuel through the former and, consequently the cut-off or shut-off motion of the compression valve means 46, 47.

Figure 9:
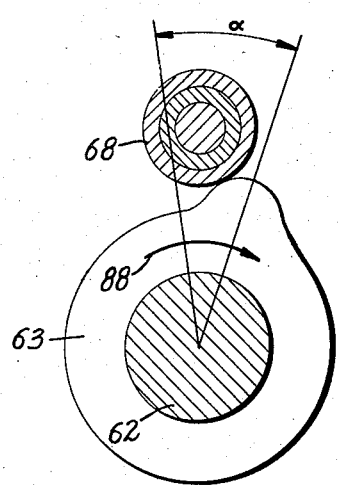

With further rotation of the cam means 63 in the direction of the arrow 88 the roller 68 arrives on the suction portion α of the cam surface, as is represented in Fig. 9, whereby the pump plunger 42 starts moving downwards in the direction of an arrow 92. A depression is created thereby within the work chamber 78 causing the fuel to flow back from the delivery means 41 through the annular interstice 87 in the direction of an arrow 93. Upon the withdrawal of the fuel into the work chamber 78 the action of the compression spring 48 becomes gradually prepondering and urges the compression valve means 46, 47 with increasing force to return to its seat 45. The head member 53 arrives thereby in the valve guide means 52 so that the passage for the reflowing fuel becomes more effectively throttled.

Figure 10:
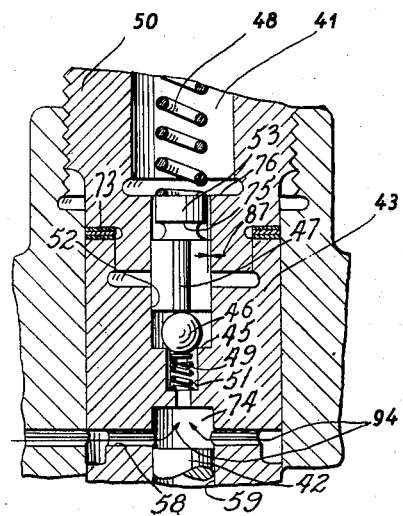
Figure 11:
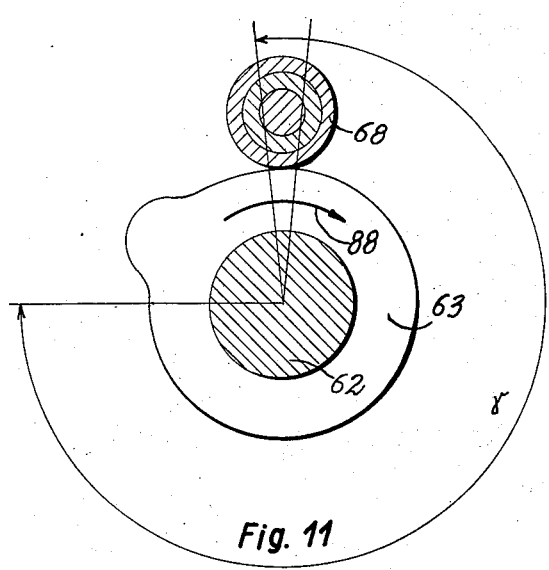

Figs. 10 and 11 illustrate an operational position wherein the roller 68 is running on the bottom portion γ of constant radius of the cam means 63 and the pump plunger 42 occupies its bottom extreme position whereby the supply channels 58 are set free for the admission of fuel. Meanwhile the compression valve means 46, 47 has reached its seat 45 and interrupted the flow of fuel from the delivery means 41 to the work chamber 78. A new amount of fuel is now supplied from the supply means 40 in the direction of an arrow 94 through the radial passages 58 to the work chamber 78.

Figure 12:
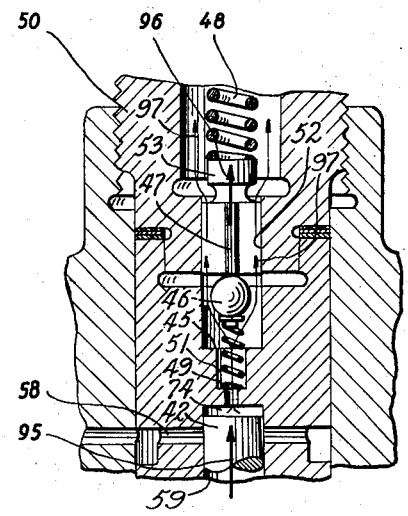
Figure 13:
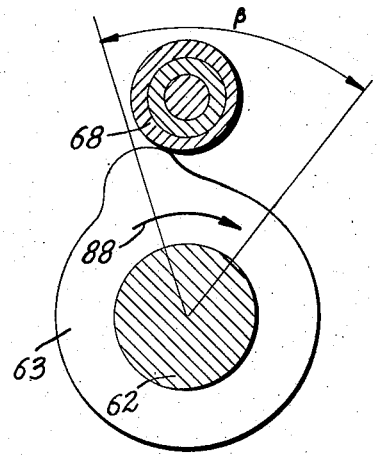

When the cam means 63 has been rotated in the direction of the arrow 88 so far that the roller 68 arrives on the compression portion β of the cam surface as represented in Fig. 13, the pump plunger 42 starts with its upward stroke in the direction of an arrow 95 as is illustrated in Fig. 12. The radial passages 58 are closed by the pump plunger 42 and the pressure of the fuel staying in the work chamber 78 increases. When the pressure of the fuel has been increased so as to overwhelm the action of the compression spring 48 with the aid of the compression spring 49, valve means 46, 47 is lifted from its seat 45 in the direction of an arrow 96 and the passage in the valve guide means 52 opened for the passage of fuel. The fuel now flows in the direction of arrows 97 from the work chamber 78 through the bores 51 and 52 to the delivery means 41 where the fuel pressure rapidly increases and entails the fuel injection in a manner known per se.

After the injection has taken place, the operational position illustrated in Figs. 6 and 7 is resumed wherein the fuel is moving in the direction of the arrow 90 and valve means 46, 47, is displaced in the direction of the arrow 91.

Figure 8:
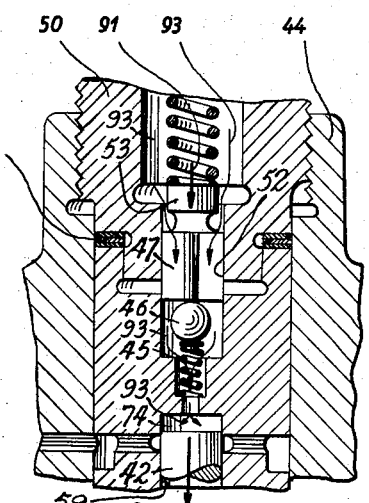

With greater speeds of the cam shaft 62 and, consequently, of the internal combustion engine there is little time for pressure compensation through the annular interstice 87, i. e. relatively less amounts of fuel flow from below the head member 53 to the delivery means 41. The fuel rather withdraws in the direction of the arrows 93 into the work chamber 78 when the pump plunger 42 is displaced downwards in the direction of the arrow 92 as is represented in Fig. 8. Consequently, a relatively lesser amount of fuel is retained in the delivery means 41 whereby also the pressure prevailing therein becomes reduced. With the next compression stroke of the pump plunger 42 in the direction of the arrow 95 various amounts of fuel will, according to the value of the pressure prevailing in the delivery means 41 after the injection having taken place, be discharged in the direction of arrows 97 in the manner shown in Fig. 12. After raising their pressure to the value needed for injection they are supplied to the combustion chamber of the internal combustion engine.

If, in contradistinction, the cam shaft 62 is running with a lesser speed, i. e. the pump plunger 42 performs slow movements, there is ample time for the compression spring 48 to shift the valve means 46, 47 in the direction of the arrow 91 towards the delivery means 41 during displacement of the fuel from below the head member 53 through the annular interstice 87 to the delivery means 41 and to cut off the passage of the fuel before a considerable displacement of the pump plunger 42 in the direction of the arrow 92 takes place. Thereby a depression is established within the work chamber 78. Consequently, relatively more fuel flows over through the annular interstice 87 to the delivery means 41 whereby the amount of fuel injected to the internal combustion engine obviously increases since the newly supplied amount of fuel is added to a relatively larger amount of fuel left behind with the previous compression stroke. Thus, the fuel delivery and thereby also the torque of the internal combustion engine increases with lowering speeds whereby the mutual behaviour of torque and number of revolutions becomes similar to that represented in Fig. 5 by the curve $c$.

With the embodiment represented in Figs. 2 to 4 the fuel delivery of the fuel injection pump associated with the full load of the internal combustion engine can be rendered dependant on the speed by forming the compression portion $\beta$, according to a further feature of the invention, so as to consist of an injection portion $\beta_2$ associated with discharging an amount of fuel and a regulation portion $\beta_1$ previous to the injection portion $\beta_2$, the pitch $\beta'_1$ of the regulation portion $\beta_1$ being in radial direction less than the pitch $\beta'_2$ of the injection portion $\beta_2$.

With the operational position illustrated in Fig. 2 of this embodiment the roller 68 occupies a position at the beginning of the suction portion α so that the pump plunger 42 with the suction valve means 77 occupies its top extreme position wherein the pump plunger 42 bears with the suction valve means 77 against the compression valve means 53 and retains the latter in a lifted position. As to the delivery means 41, for the time being, the pressure of injection is prevailing therein which effects the discharge of fuel from the delivery means 41 in the direction of the arrows 97. With the injection effected the pressure is setting to a lesser value dependant on the force needed for opening the injection valve (not shown).

Figures 14, 16:
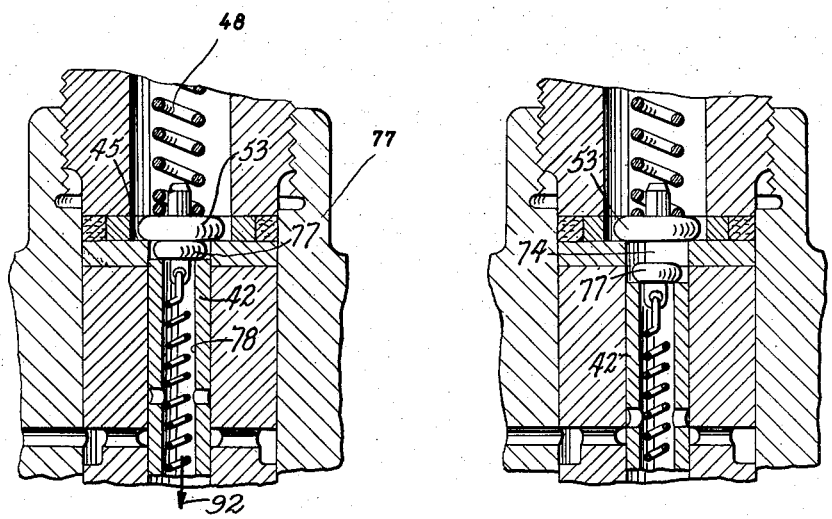
Figs. 14 to 23 represent various operational positions of the embodiment shown in Figs. 2 to 4.
Figures 15, 17:
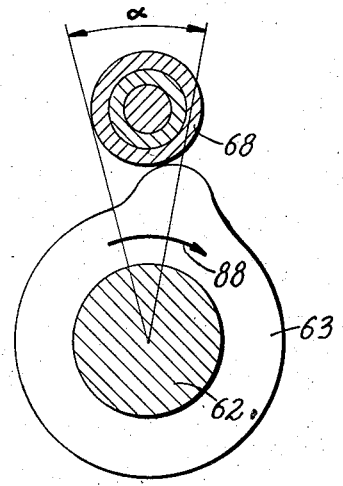

The operational position corresponding to further rotation of the cam shaft 62 in the direction of the arrow 88 is illustrated in Figs. 14 and 15. The roller 68 is running on the suction portion of the cam surface so that the pump plunger 42 is displaced in the direction of the arrow 92 towards the supply means 40. Thereby the compression spring 48 urges the compression valve means 53 to partake in this downwards movement till it strikes against its seat 45.

At the extremity of the suction portion α the pump plunger 42 approaches its bottom extreme position, as shown in Figs. 16 and 17, in which the compression valve means 53 and the suction valve means 77 are already separated from one another so that a depression is created in the work chamber 74.

Figure 18:
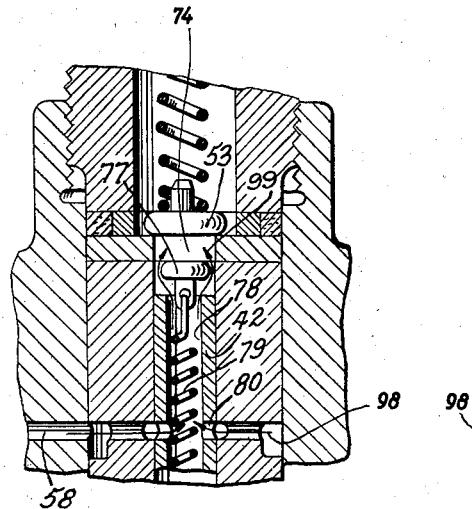
Figure 19:
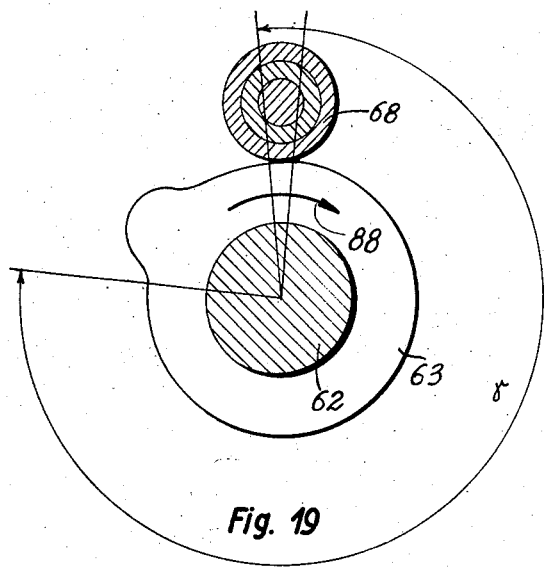

Thereafter the roller first comes to run on the bottom portion γ of constant radius corresponding to the bottom extreme position of the pump plunger 42, as is shown in Figs. 18 and 19. The supply passages 58 are now in flushed relationship with the passages 80 so that the chamber 78 of the pump plunger 42 is being filled up by the fuel supplied in the direction of arrows 98. The common action of the pressure prevailing in the chamber 78 and the depression prevailing in the work chamber 74 overwhelms the closing action of the extension spring 79 so that the suction valve means 77 leaves its closing position at the top rim of the pump plunger 42 and allows the fuel to flow over in the direction of arrows 99 from the chamber 78 into the work chamber 74.

Figure 20:
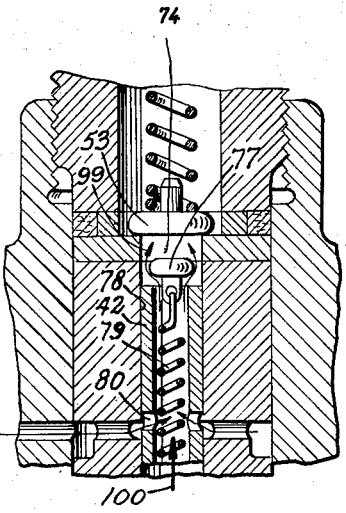
Figure 21:
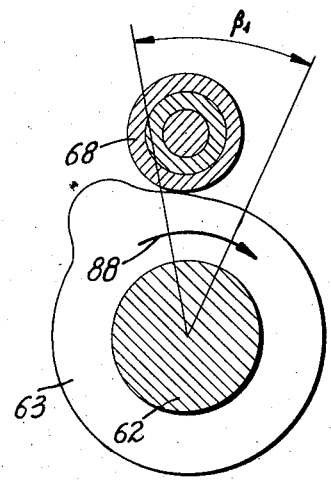

Meanwhile the roller 68 arrives, as shown in Figs. 20 and 21, onto the regulation portion $\beta_1$ whereby the pump plunger 42 slowly departs from its bottom extreme position in the direction of an arrow 100. The overflowing of the fuel from the chamber 78 into the work chamber 74 is still going on thereby though the pressure prevailing in the latter is already increasing and the suction valve means 77 is, in consequence of the decreasing difference between the pressures prevailing in the chambers 74 and 78, respectively, being displaced by the extension spring 79 so as to resume its closing position at the top rim of the pump plunger 42.

Figure 22:
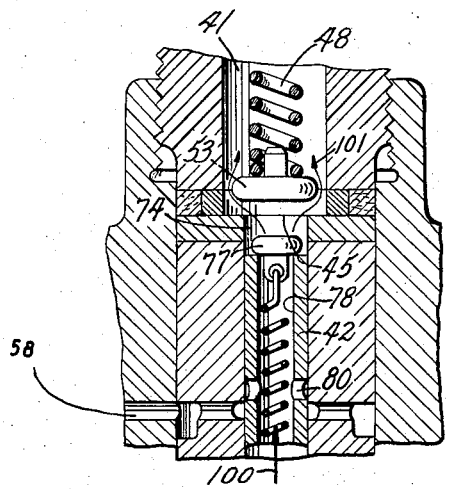
Figure 23:
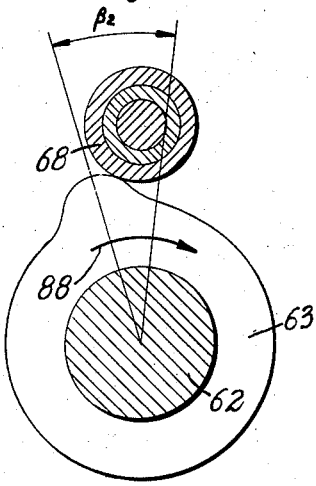

With the roller 68 having arrived at the injection portion $\beta_2$ shown in Figs. 22 and 23 the suction valve means 77 has again resumed its closing position so that the pressure prevailing in the work chamber 74 rapidly increases. In consequence hereof the compression valve means 53 becomes displaced from its seat 45 and an amount of fuel flows from the work chamber 74 in the direction of arrows 101 to the delivery means 41. The fuel injection takes place as soon as the pressure prevailing in the delivery means 41 reaches the needed value.

At the end of the injection portion $\beta_2$ the roller 68 stands anew at the beginning of the suction portion $\alpha$, as is illustrated in Fig. 2, whereby the above described cycle starts again.

Obviously, by the insertion of the regulation portion $\beta_1$ the fuel delivery is rendered dependent on the speed in the desired manner. Namely, with the cam shaft 62 rotating slowly the work chamber 74 is already filled up with fuel when the roller 68 is still running on the initial portion of the regulation portion $\beta_1$ whereby a greater axial length of the work chamber 74 and, consequently, an increased fuel delivery is obtained. With low speeds this corresponds to a greater torque of the motor. In case of high speeds of the cam shaft 62, in contradistinction, relatively lesser time is left for having the work chamber 74 filled up with fuel whereby also the conditions of throttling are altered so that the suction valve means 77 will be closed towards the extremity of the regulation portion $\beta_1$ only in consequence whereof the axial length of the work chamber 74 and thereby the fuel delivery becomes correspondingly decreased. This, however, results in lesser torques at higher speeds.

The above described manner of controlling the fuel delivery so as to have it, at full loads, rendered dependant on the speed is particularly suitable for fuel injection pumps provided with the control means 54 for throttling the supply means 40 so as to adjust the fuel delivery associated with partial loads of the internal combustion engine to a preselected value.

Obviously, the present invention is also suitable for multiple-action fuel injection pumps which are provided with a gang of individual pump elements formed, otherwise, in compliance with any of the previously described single-action embodiments. In order to prevent pressure reaction among the work chambers of the individual pump elements through a common supply means, the formers and their individual cam means are, in compliance with a further feature of the present invention, mutually arranged so as to separate the time period of supplying an amount of fuel to one of the work chambers from the time periods of supplying amounts of fuel to the remainder thereof.

If e. g. a number of $n$ pump elements is ganged and their individual cam means comprise each an individual suction portion and an individual compression portion, as has been described with reference to e. g. Fig. 4, the aforesaid separation of the time periods of supplying fuel to the various work chambers can, in compliance with a further feature of the invention, be effected by adding individual delaying portions to each of the individual compression portions. The individual suction portions are staggered to extend with respect to a common cam shaft by a central angle having a value of maximum $$\frac{1}{n}\cdot 360°$$

each of the individual cam means being arranged on the common cam shaft so as to have the individual suction portions rendered mutually staggered by at least the aforesaid value of their central angle.

Figure 24:
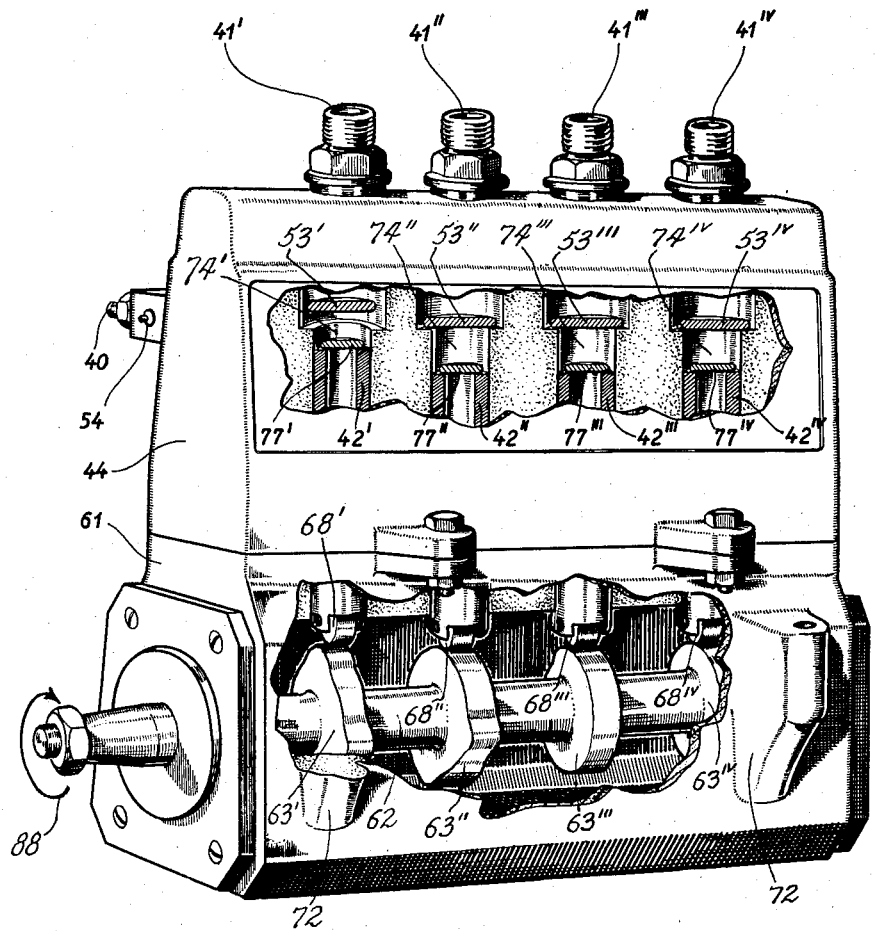
Fig. 24 illustrates a perspective view of still another embodiment.
Figure 25:
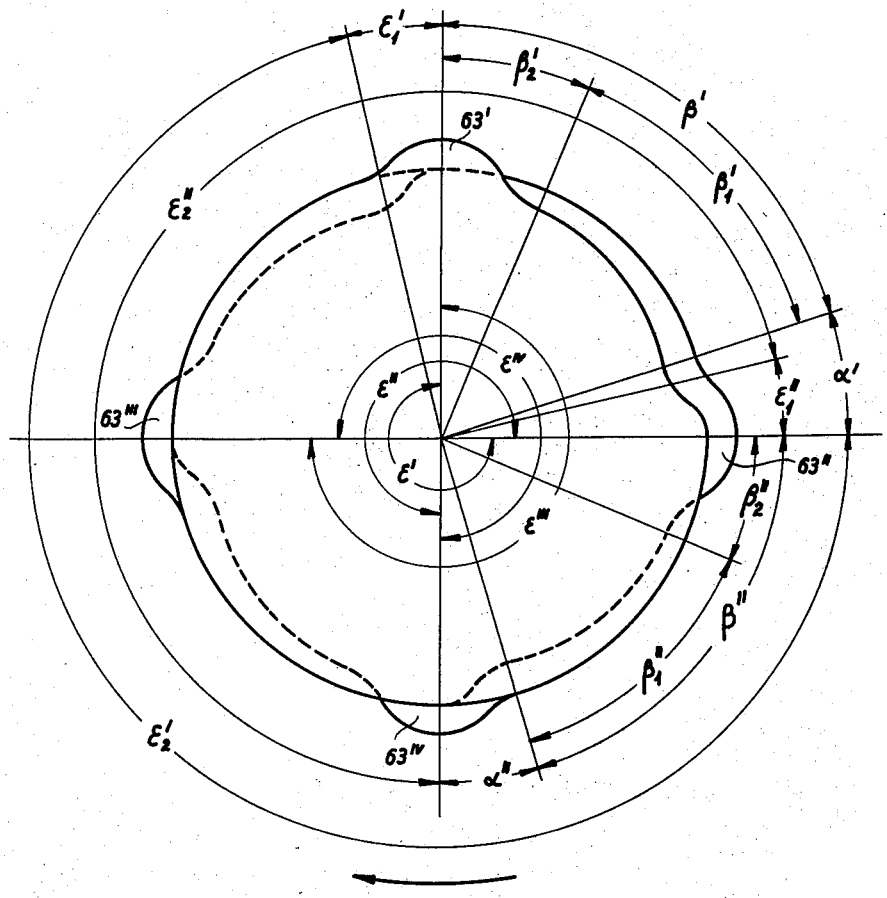
Fig. 25 is the view of a detail of the embodiment represented in Fig. 24.

Such an embodiment of the present invention is represented in Figs. 24 and 25. Fig. 24 shows the fuel injection pump to comprise four individual pump elements so that $n$ equals four. Their common supply means 40 is controlled by means of throttling whereas each of the individual pump elements is associated with an individual delivery means $41^I$ to $41^{IV}$. Each of the individual pump elements is provided with an individual compression valve means $53^I$ to $53^{IV}$ and an individual suction valve means $77^I$ to $77^{IV}$ as was the case with the above described single-action fuel injection pumps shown in Figs. 2 to 4 and 14 to 23, respectively, and is operated by individual cam means $63^I$ to $63^{IV}$ arranged on a common cam shaft 62.

The form and the mutual arrangement of the cam means $63^I$ to $63^{IV}$ is illustrated in Fig. 25. The cam surface of each of the individual cam means comprises an individual suction portion $\alpha^I$ to $\alpha^{IV}$ associated with introducing an amount of fuel from the common supply means 40 into the individual work chambers, e. g. into the work chamber $74^{III}$ or $75^{IV}$ and an individual compression portion $\beta^I$ to $\beta^{IV}$ adjacent to the individual suction portions $\alpha^I$ to $\alpha^{IV}$ and associated each with displacing an amount of fuel from the individual work chambers, e. g. the individual work chamber $74^{IV}$, into the individual delivery means $41^I$ to $41^{IV}$.

For preventing communication between the common supply means 40 and the individual work chambers, e. g. the work chamber $74^{IV}$, individual delaying portions $\epsilon^I$ to $\epsilon^{IV}$ may be added each to one of the individual compression portions $\beta$ to $\beta^{IV}$, respectively, the central angles associated with the individual suction portions $\alpha^I$ to $\alpha^{IV}$ with respect to the common cam shaft 62 may have the maximum value of $$\frac{1}{4}\cdot 360°=90°$$

If they are mutually staggered by an angle of this value the time periods of the suction performances are separated from one another since there are no overlappings of the suction portions $\alpha^I$ to $\alpha^{IV}$. It means that the suction portions $\alpha^I$ to $\alpha^{IV}$ could extend each up to an amount of 90° of their central angles without the suction performances of the individual pump elements being overlapped.

With the represented embodiment, however, the size of the suction portions $\alpha$ is selected so as to extend to a value less than $$\frac{1}{n}\cdot 360°$$

in which case the suction performances in the individual pump elements are not even adjacent to one another. In this case the central angles of the amount of $$\frac{1}{4}\cdot 360°=90°$$

are, in compliance with a further feature of the invention, associated also with the compression portions $\beta^I$ to $\beta^{IV}$ of the cam surface, i. e. the adjacent individual suction portions $\alpha^I$ to $\alpha^{IV}$ and the individual compression portions $\beta^I$ to $\beta^{IV}$, respectively, are selected so as to extend with respect to the common cam shaft 62 by a common central angle having a value of maximum 90° which corresponds to the general value of $$\frac{1}{n} \cdot 360°$$

The individual cam means $63^I$ to $63^{IV}$ are arranged on the common cam shaft 62 so as to have the adjacent individual suction portions $\alpha^I$ to $\alpha^{IV}$ and the individual compression portion $\beta^I$ to $\beta^{IV}$, respectively, rendered mutually staggered by the aforesaid value of their common central angle. The illustrated embodiment differs from the embodiment shown in Figs. 2 to 4 and 13 to 23 in that there are no bottom portions $\gamma$ of constant radius since the individual compression portions $\beta^I$ to $\beta^{IV}$ follow immediately on the associated individual suction portions $\alpha^I$ to $\alpha^{IV}$ as referred to above. Otherwise the individual pump elements are formed in accordance therewith so that the compression portions $\beta^I$ to $\beta^{IV}$ consist, as is shown in Fig. 24, of individual regulation portions $\beta_1^I$ to $\beta_1^{IV}$ and individual injection portions $\beta_2^I$ to $\beta_2^{IV}$, respectively.

Moreover, as is shown in Fig. 25, the individual retardation portions $\epsilon^I$ to $\epsilon^{IV}$ comprise, in compliance with a further feature of the present invention, each a relief portion for displacing the individual pump plungers $42^I$ to $42^{IV}$ towards the common supply means 40 for reducing the pressure exerted by the formers on the individual cam means $63^I$ to $63^{IV}$ so as to decrease their load associated with the remainder of the individual retardation portions $\epsilon^I$ to $\epsilon^{IV}$. Accordingly, the delaying portions $\epsilon^I$ to $\epsilon^{IV}$ are subdivided each into the said relief portion $\epsilon_1^I$ to $\epsilon_1^{IV}$ and a transition portion $\epsilon_2^I$ to $\epsilon_2^{IV}$, respectively. The relief portions $\epsilon_1^I$ to $\epsilon_1^{IV}$ follow thereby immediately upon the associated injection portions $\beta_2^I$ to $\beta_2^{IV}$ as is in accordance with the principle of operation of the new individual pump elements since such an arrangement results, in compliance with the main feature of the invention, directly in reducing the pressure prevailing in the delivery means $41^I$ to $41^{IV}$ during displacement of the individual pump plungers $42^I$ to $42^{IV}$ towards the common supply means 40.

The transition portions $\epsilon_2^I$ to $\epsilon_2^{IV}$ are, with the represented embodiment, formed so as to have the course of a spiral. They could, however, be also formed so as to have a shorter initial portion with rapidly falling radius and an adjacent longer final portion of constant radius, the latter already corresponding to the position of the individual pump plungers $42^I$ to $42^{IV}$ at the beginning of the individual suction portions $\alpha^I$ to $\alpha^{IV}$. In both cases the transition portions $\epsilon_2^I$ to $\epsilon_2^{IV}$ serve also for increasing the relief of the drive means of the individual pump elements since they allow the individual pump plungers $42^I$ to $42^{IV}$ to be further displaced towards the common supply means 40 and thereby to relieve components like springs provided for causing the individual pump plungers $42^I$ to $42^{IV}$ to resume their bottom extreme position, and the bearing of the individual rollers $68^I$ to $68^{IV}$.

Obviously, with the hitherto described single-action and multiple-action fuel injection pumps the adjustment of the fuel delivery is feasible out of operation only. Thus, their setting, particularly that of the multiple-action type requires eventually repeated stoppings and restartings of the engine so as to ascertain whether the adjustment was appropriate.

The drawback of such cumbersome methods of adjustment has also been eliminated by the present invention in that fuel injection pumps particularly of the multiple-action type having individual tappet means of adjustable axial length for operating each another of individual pump plungers and a control system comprising individual control means each associated with one of individual pump elements and adapted to adjust the axial length of the individual tappet means, as has been described by taking reference to Figs. 2 to 4 may, in compliance with a further feature of the present invention, be provided with common control means for selectively operating the individual control means from without. The former may consist of common gearing means whereas the individual control means preferably consist of individual gearing means each associated with one of the individual tappet means, and individual tooth means supported by the common gearing means and adapted to be selectively engaged with the individual gearing means.

Figure 26:
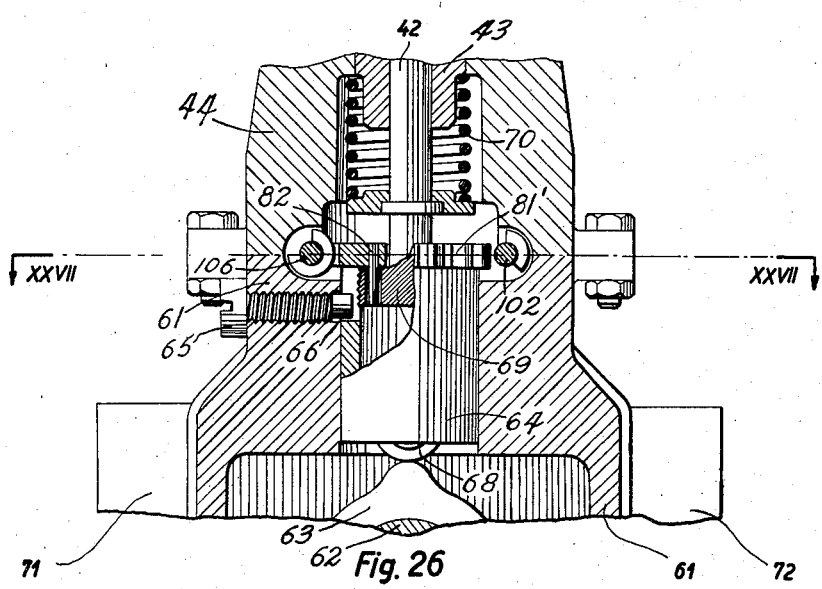
Fig. 26 shows a sectional view of a further embodiment taken along the line XXVI—XXVI of Fig. 28.
Figure 28:
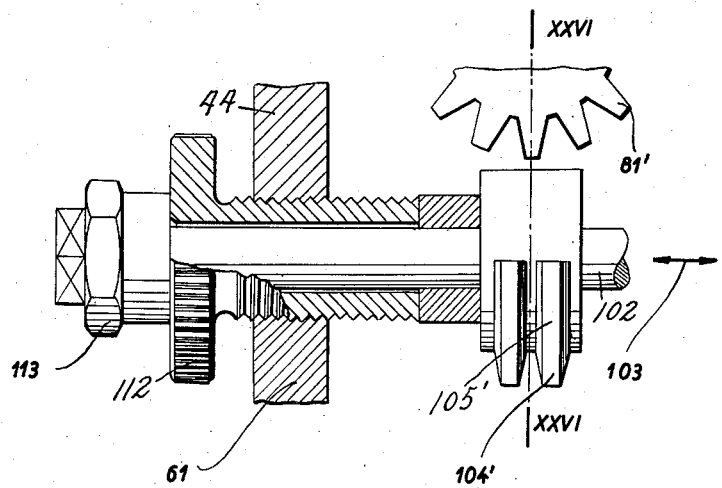
Fig. 28 is a view of a detail of Fig. 27 at a relatively larger scale.
Figure 27:
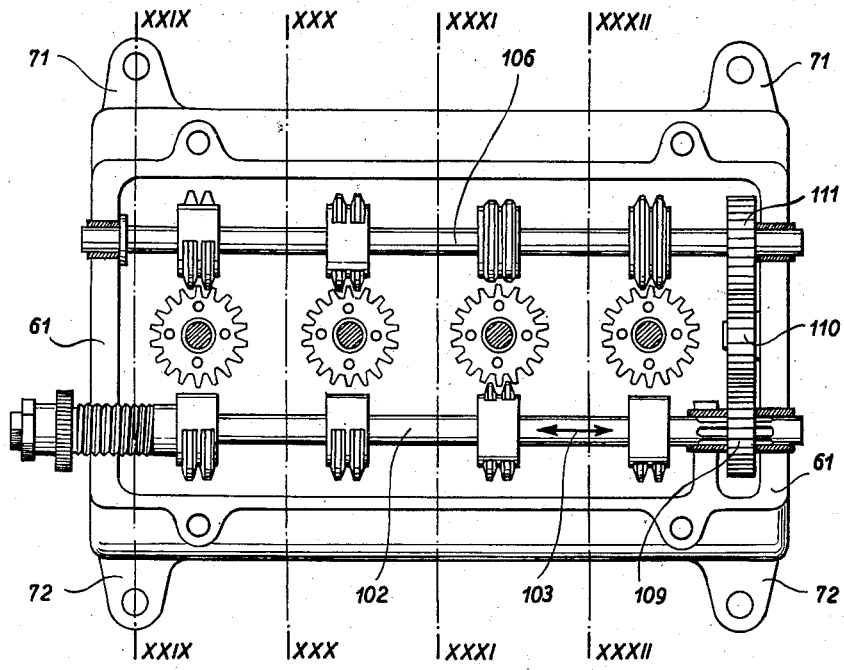
Fig. 27 represents a view taken along a separating surface of the pump housing as indicated by the lines XXVII—XXVII of Fig. 26.
Figures 29, 30, 31, 32:
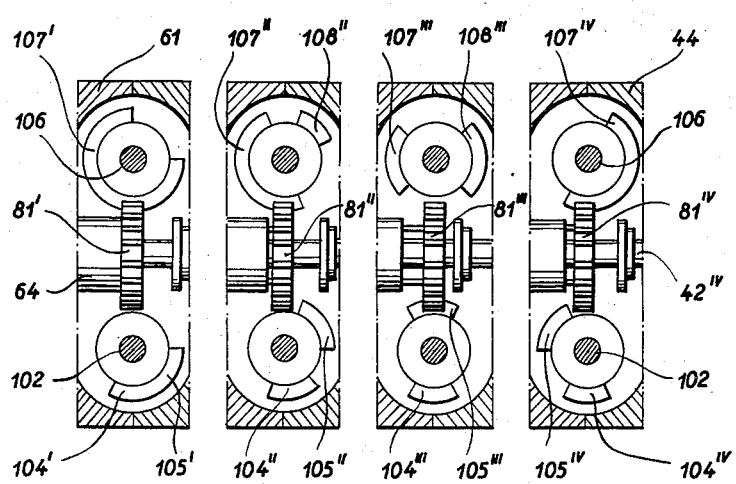
Figs. 29 to 32 show associated individual sectional views taken along the lines XXIX—XXIX to XXXII—XXXII of Fig. 27, respectively.

Such an embodiment of the present invention is represented in Figs. 26 to 32. As is obvious from Fig. 26, this embodiment corresponds in principle to that shown in Figs. 2 to 4 apart from being a multiple-action instead of a single-action type since it is designed to be associated with a four cylinder internal combustion engine. Accordingly, the fuel injection pump comprises four individual pump elements the axial sectional view of which is shown in Fig. 26. For the individual gearing means the individual pump elements are likewisely provided with pinions $81^I$ to $81^{IV}$ with the components engaging therewith each associated with one of the individual tappet means and adapted to adjust the axial length thereof. The common gearing means is formed by a common toothed rack means 102 adapted to be operated from without, individual tooth means being arranged on the common toothed rack means so as to be capable of being selectively engaged with the individual gearing means. Therefore, the common toothed rack means 102 is, in compliance with a further feature of the invention, arranged rotatably about its axial centre-line 103, the tooth means forming two individual groups of teeth $104^I$ to $104^{IV}$ and $105^I$ to $105^{IV}$, respectively, supported in fixed mutual relationship by the common toothed rack means 102 along the periphery thereof. The first individual groups of teeth $104^I$ to $104^{IV}$ are supported by the common toothed rack means 102 in mutually aligned axial relationship whereas the second individual groups of teeth $105^I$ to $105^{IV}$ are supported by the common toothed rack means 102 in mutually staggered axial relationship as is particularly obvious from Figs. 29 to 32. The elements of the first individual groups of teeth $104^I$ and $105^I$ form pairwisely a continuous shoulder though they might be formed so as to be discontinuous as well. Obviously, the first individual groups of teeth $104^I$ to $104^{IV}$ are adapted to be simultaneously engaged with the individual pinions $81^I$ to $81^{IV}$ whereas the second individual groups of teeth $105^I$ to $105^{IV}$ are adapted to be selectively engaged therewith upon rotation of the common toothed rack means 102.

It is, however, advantageous, in compliance with another feature of the present invention, to form the common control means so that it arrest, besides selectively operating the individual control means, the non-selected ones against unintentional adjustment. To this purpose the represented embodiment is provided, besides the previously described or first common toothed rack means 102, with a rotatable further or second common toothed rack means 106 arranged so as to be opposite to the first common toothed rack means 102 with respect to the individual pinions $81^I$ to $81^{IV}$ and provided with third individual groups of teeth $107^I$ to $107^{IV}$ as well as $108^{II}$ and $108^{III}$. The first and second individual groups of teeth $104^I$ to $104^{IV}$ and $105^I$ to $105^{IV}$ and the third individual groups of teeth $107^I$ to $107^{IV}$ as well as $108^{II}$ and $108^{III}$ are in complementary mutual relationship as regards the first common toothed rack means 102 and the second common toothed rack means 106 so as to have the individual pinions $81^I$ to $81^{IV}$ when being selectively engaged with the first and second individual groups of teeth $104^I$ to $104^{IV}$ and $105^I$ to $105^{IV}$, respectively, be disengaged with the third individual groups of teeth $107^I$ to $107^{IV}$ as well as $108^{II}$ and $108^{III}$ and the non-selected individual pinions $81^I$ to $81^{IV}$ arrested by the latters. Thus, each of the pinions $81^I$ to $81^{IV}$ is adapted to be engaged either with the first and second individual groups of teeth $104^I$ to $104^{IV}$ and $105^I$ to $105^{IV}$, respectively, of the common first toothed rack means 102 in the above described manner, or with the third individual groups of teeth $107^I$ to $107^{IV}$ as well as $108^{II}$ and $108^{III}$ of the second common toothed rack means 106. The first common toothed rack means 102 and the second common toothed rack means 106 are connected by a gearing means 109, 110, 111 of a well known type which is adapted to positively transmit rotational motion from the first common toothed rack means 102 to the second common toothed rack means 106. Obviously, the third individual groups of teeth $107^I$ to $107^{IV}$ as well as $108^{II}$ and $108^{III}$ are adapted to be individually engaged with the individual pinions $81^I$ to $81^{IV}$ upon rotation of the first common toothed rack means 102. The axial displacement of the latter is effected by a threaded sleeve 112 which is in threaded engagement with the wall of the pump housing 44, 61 and causes, upon rotation, the first common toothed rack means 102 to be axially displaced. Engagement between both groups of teeth $104^I$ to $104^{IV}$ and $105^I$ to $105^{IV}$, respectively, and the pinions $81^I$ to $81^{IV}$ is adjusted by rotating the first common toothed rack means 102 about its longitudinal centre-line 103 by means of a hand operated knob 113.

In operation, if all pinions $81^I$ to $81^{IV}$ are to be simultaneously adjusted, the knob 113 is rotated so as to engage the individual groups of teeth $104^I$ to $104^{IV}$ each with its associated pinion $81^I$ to $81^{IV}$, respectively. Simultaneously therewith the second common toothed rack means 106 is rotated by means of the gearing means 109, 110, 111 so as to have the individual pinions $81^I$ to $81^{IV}$ to be disengaged with all of the individual groups of teeth $107^I$ to $107^{IV}$ as well as $108^{II}$ and $108^{III}$. Thereafter, the threaded sleeve 112 is rotated in the suitable direction till the axial displacement of the first common toothed rack means 102 reaches the desired value in the desired direction. Thereupon, the first individual groups of teeth $104^I$ to $104^{IV}$ are disengaged with the pinions $81^I$ to $81^{IV}$ and their adjusted position is, by means of the third individual groups of teeth $107^I$ to $107^{IV}$ as well as $108^{II}$ and $108^{III}$, arrested against further adjustment.

If, however, the fuel delivery of but one of the individual pump elements, e. g. of that associated with the individual pinion $81^{III}$, has to be adjusted, the first common toothed rack means 102 is rotated so that the individual group of teeth $105^{III}$ become engaged with the individual pinion $81^{III}$ whereas the remaining pinions $81^I$, $81^{II}$ and $81^{IV}$, i. e. the non-selected ones, be engaged each with the associated third individual groups of teeth $108^I$, $108^{II}$ and $108^{IV}$, respectively. Thus, upon axially displacing the first common toothed rack means 102 by means of rotating the threaded sleeve 112 in the suitable direction the pinion $81^{III}$ is being rotated so as to adjust the axial length of the associated tappet means in the desired manner whereas the remaining pinions $81^I$, $81^{II}$ and $81^{IV}$ are arrested by means of the third individual groups of teeth $108^I$, $108^{II}$ and $108^{IV}$ against adjustment.

Obviously, the remaining pinions $81^I$, $81^{II}$ and $81^{IV}$ can be selectively or in groups likewisely adjusted, the pinions not to be adjusted being, at the same time, arrested against adjustment as has been described in connection with the adjustment of the pinion $81^{III}$.

What I claim is:

1. A fuel injection pump for internal combustion engines of the type described, having a pump barrel, a pump plunger slidably arranged within said pump barrel, a work chamber enclosed by said pump barrel and said pump plunger, supply means for introducing an amount of fuel to said work chamber, delivery means for receiving an amount of fuel from said work chamber, guide means, valve means arranged in said guide means to control the flow of fuel therethrough in its passage from said work chamber to said delivery means, and control means for varying the length of said guide means for delaying the valve closing action of said valve means and thereby reducing the fuel pressure prevailing in said delivery means during the suction stroke of said pump plunger so as to adjust the fuel delivery associated with the full load of the internal combustion engine at a predetermined number of revolutions thereof to a preselected value.

2. A fuel injection pump for internal combustion engines of the type described, having a pump barrel, a pump plunger slidably arranged within said pump barrel, a work chamber enclosed by said pump barrel and said pump plunger, supply means for introducing an amount of fuel to said work chamber, delivery means for receiving an amount of fuel from said work chamber, guide means, compression valve means arranged in said guide means to control the flow of fuel therethrough in its passage from said work chamber to said delivery means, a head member forming a portion of said valve means adapted to throttle the flow of fuel through said guide means so as to delay the valve closing action of said valve means, and control means adapted to shift the extreme positions of said head member with respect to said guide means for adjusting the period of delay of said valve means and thereby reducing the fuel pressure prevailing in said delivery means during the suction stroke of said pump plunger so as to adjust, in turn, the fuel delivery associated with the full load of the internal combustion engine at a predetermined number of revolutions thereof to a preselected value.

3. A fuel injection pump for internal combustion engines of the type described, having a pump barrel, a pump plunger slidably arranged within said pump barrel, a work chamber enclosed by said pump barrel and said pump plunger, supply means for introducing an amount of fuel to said work chamber, delivery means for receiving an amount of fuel from said work chamber, guide means, compression valve means arranged in said guide means so as to control the flow of fuel therethrough in its passage from said work chamber to said delivery means, a head member forming a portion of said valve means adapted to throttle the flow of fuel through said guide means so as to delay the valve closing action of said valve means, and control means adapted to shift the axial position of said guide means and thereby the extreme positions of said head member with respect to said guide means for adjusting the period of delay of said valve means and thereby reducing the fuel pressure prevailing in said delivery means during the suction stroke of said pump plunger so as to adjust, in turn, the fuel delivery associated with the full load of the internal combustion engine at a predetermined number of revolutions thereof to a preselected value.

4. A fuel injection pump for internal combustion engines of the type described, having a pump barrel, a pump plunger slidably arranged within said pump barrel, a work chamber enclosed by said pump barrel and said pump plunger, supply means for introducing an amount of fuel to said work chamber, delivery means for receiving an amount of fuel from said work chamber, guide means, compression valve means arranged in said guide means to control the flow of fuel therethrough in its passage from said work chamber to said delivery means, a head member forming a portion of said valve means adapted to throttle the flow of fuel through said guide means to delay the valve closing action of said valve means, and control means adapted to shift the extreme positions of said head member with respect to said guide means for adjusting the period of delay of said valve means and thereby reducing the fuel pressure prevailing in said delivery means during the suction stroke of said pump plunger so as to adjust, in turn, the fuel delivery of the fuel injection pump associated with the full load of the internal combustion engine at a predetermined number of revolutions thereof to a preselected value, said head member being spaced a predetermined distance from said guide means so as to have the adjustment of the fuel delivery rendered dependent on the speed of the internal combustion engine.

5. A fuel injection pump for internal combustion engines of the type described, having a pump barrel, a pump plunger slidably arranged within said pump barrel, a work chamber enclosed by said pump barrel and said pump plunger, supply means for introducing an amount of fuel to said work chamber, delivery means for receiving an amount of fuel from said work chamber, and control means consisting of compression valve means arranged to control the flow of fuel in its passage from said work chamber to said delivery means, the extreme positions of said pump plunger being shifted with respect to said pump barrel towards said delivery means to cause said pump plunger in its position adjacent to said delivery means to bear against and hold said valve means in a lifted position for delaying its valve closing action and thereby reducing the fuel pressure prevailing in said delivery means during the suction stroke of said pump plunger so as to adjust the fuel delivery associated with the full load of the internal combustion engine at a predetermined number of revolutions thereof to a preselected value.

6. A fuel injection pump for internal combustion engines of the type described, having a pump barrel, a hollow pump plunger slidably arranged within said pump barrel and defining a passageway therethrough, a work chamber enclosed by said pump barrel and said pump plunger, supply means for introducing an amount of fuel to said work chamber, delivery means for receiving an amount of fuel from said work chamber, a chamber within said pump plunger communicable through said passageway with said supply means for receiving an amount of fuel therefrom, suction valve means arranged so as to control the flow of fuel in its passage from said chamber within said pump plunger to said work chamber, compression valve means arranged to control the flow of fuel in its passage from said work chamber to said delivery means, said suction valve means being arranged to seat on the end of said pump plunger adjacent said compression valve means to close said passageway and to bear against said compression valve means, and control means adapted to adjust the extreme positions of said pump plunger with respect to said pump barrel to cause said pump plunger in its position adjacent to said delivery means to bear with said suction valve means against and hold said compression valve means in a lifted position for delaying its valve closing action motion and thereby reducing the fuel pressure prevailing in said delivery means during the suction stroke of said pump plunger so as to adjust, in turn, the fuel delivery associated with the full load of the internal combustion engine at a predetermined number of revolutions thereof to a preselected value.

7. A fuel injection pump for internal combustion engines of the type described, having a pump barrel, a hollow pump plunger slidably arranged within said pump barrel and defining a passageway therethrough, a work chamber enclosed by said pump barrel and said pump plunger, supply means for introducing an amount of fuel to said work chamber, delivery means for receiving an amount of fuel from said work chamber, a chamber within said pump plunger communicable through said passageway with said supply means for receiving an amount of fuel therefrom, suction valve means arranged to control the flow of fuel in its passage from said chamber within said pump plunger to said work chamber, compression valve means arranged to control the flow of fuel in its passage from said work chamber to said delivery means, said suction valve means being arranged to seat on the end of said pump plunger adjacent said compression valve means to close said passageway and to bear against said compression valve means, and control means adapted to adjust the extreme positions of said pump plunger with respect to said pump barrel so as to cause said pump plunger in its position adjacent to said delivery means to bear with said suction valve means against and hold said compression valve means in a lifted position for delaying its valve closing action motion and thereby reducing the fuel pressure prevailing in said delivery means during the suction stroke of said pump plunger so as to adjust, in turn, the fuel delivery associated with the full load of the internal combustion engine at a predetermined number of revolutions thereof to a preselected value, said suction valve means and said compression valve means being provided with flat bearing surfaces facing one another and adapted to displace air from said work chamber and to decrease its cylinder clearance when bearing against one another.

8. A fuel injection pump for internal combustion engines of the type described, having a pump barrel, a hollow pump plunger slidably arranged within said pump barrel and defining a passageway therethrough, tappet means of adjustable axial length for operating said pump plunger, a work chamber enclosed by said pump barrel and said pump plunger, supply means for introducing an amount of fuel through said passageway to said work chamber, delivery means for receiving an amount of fuel from said work chamber, a chamber within said pump plunger communicable through said passageway with said supply means for receiving an amount of fuel therefrom, suction valve means arranged to control the flow of fuel in its passage from said chamber within said pump plunger to said work chamber, compression valve means arranged to control the flow of fuel in its passage from said work chamber to said delivery means, said suction valve means being arranged to seat on the end of said pump plunger adjacent said compression valve means to close said passageway and to bear against said compression valve means, and control means adapted to be operated from without and to adjust the axial length of said tappet means and thereby to shift the extreme positions of said pump plunger with respect to said pump barrel to cause said pump plunger in its position adjacent to said delivery means to bear with said suction valve means against and hold said compression valve means in a lifted position for delaying its valve closing action and thereby reducing the fuel pressure prevailing in said delivery means during a suction stroke of said pump plunger so as to adjust, in turn, the fuel delivery associated with the full load of the internal combustion engine at a predetermined number of revolutions thereof to a preselected value.

9. A fuel injection pump for internal combustion engines of the type described, having a pump barrel, a hollow pump plunger slidably arranged within said pump barrel and defining a passageway therethrough, a work chamber enclosed by said pump barrel and said pump plunger, a cam shaft, cam means supported by said cam shaft for operating said pump plunger within said pump barrel, supply means for introducing an amount of fuel to said work chamber through said passageway, delivery means for receiving an amount of fuel from said work chamber, a chamber within said pump plunger communicable through said passageway with said supply means for receiving an amount of fuel therefrom, suction valve means arranged to control the flow of fuel in its passage from said chamber within said pump plunger to said work chamber, compression valve means arranged to control the flow of fuel in its passage from said work chamber to said delivery means, said suction valve means being arranged to seat on the end of said pump plunger adjacent said compression valve means to close said passageway and to bear against said compression valve means, and control means adapted to adjust the extreme positions of said pump plunger with respect to said pump barrel to cause said pump plunger in its position adjacent to said delivery means to bear with said suction means against and hold said compression valve means in a lifted position for delaying its valve closing action and thereby reducing the fuel pressure prevailing in said delivery means during the suction stroke of said pump plunger so as to adjust, in turn, the fuel delivery associated with the full load of the internal combustion engine at a predetermined number of revolutions thereof to a preselected value, said cam means comprising a suction portion associated with supplying an amount of fuel from said supply means, and a compression portion associated with displacing an amount of fuel to said delivery means, said compression portion consisting of an injection portion associated with discharging an amount of fuel and a regulation portion previous to said injection portion, the pitch of said regulation portion being less than the pitch of said injection portion so as to have the adjustment of the fuel delivery rendered dependent on the speed of the internal combustion engine.

10. A fuel injection pump for internal combustion engines of the type described, comprising a gang of $n$ individual pump elements each having an individual pump barrel, an individual pump plunger slidably arranged within said individual pump barrel, and an individual work chamber enclosed by said individual pump barrel and said individual pump plunger, common supply means for introducing an amount of fuel to said individual work chambers, individual delivery means each associated with and adapted to receive an amount of fuel from another of said individual work chambers, a common cam shaft, individual cam means arranged on said common cam shaft each associated with and adapted to operate one of said individual pump elements, said individual cam means comprising each an individual suction portion associated with introducing an amount of fuel from said common supply means into said individual work chambers, an individual compression portion associated with displacing an amount of fuel from said individual work chambers into said individual delivery means, and an individual delay portion added to said individual compression portions for preventing communication between said common supply means and said individual work chambers, and control means for reducing the fuel pressure prevailing in said individual delivery means during the suction stroke of said individual pump plungers to adjust the fuel delivery associated with the full load of the internal combustion engine at a predetermined number of revolutions thereof to a preselected value, said individual suction portions being staggered from each other to extend with respect to said common cam shaft by a central angle having a value of maximum.

$$\frac{1}{n} \cdot 360°$$

said individual cam means being arranged on said common cam shaft so as to have said individual suction portions rendered mutually staggered by at least the said value of their central angle.

11. A fuel injection pump for internl combustion engines of the type described, comprising a gang of $n$ individual pump elements each having an individual pump barrel, an individual pump plunger slidably arranged within said individual pump barrel, and an individual work chamber enclosed by said individual pump barrel and said individual pump plunger, common supply means for introducing an amount of fuel to said individual work chambers, individual delivery means each associated with and adapted to receive an amount of fuel from another of said individual work chambers, a common cam shaft, individual cam means arranged on said common cam shaft each associated with and adapted to operate one of said individual pump elements, said individual cam means comprising each an individual suction portion associated with introducing an amount of fuel from said common supply means into said individual work chambers, an individual compression portion adjacent to said individual suction portion and associated with displacing an amount of fuel from said individual work chambers into said individual delivery means, and an individual delay portion added to said individual compression portions for preventing communication between said common supply means and said individual work chambers, and control means for reducing the fuel pressure prevailing in said individual delivery means during the suction stroke of said individual pump plungers so as to adjust the fuel delivery associated with the full load of the internal combustion engine at a predetermined number of revolutions thereof to a preselected value, said adjacent individual suction portions and said individual compression portions being staggered from each other to extend with respect to said common cam shaft by a common central angle having a value of maximum $$\frac{1}{n} \cdot 360°$$

said individual cam means being arranged on said common cam shaft so as to have said adjacent individual suction portions and said individual compression portions rendered mutually staggered by at least the said value of their common central angle.

12. A fuel injection pump for internal combustion engines of the type described comprising a gang of $n$ individual pump elements each having an individual pump barrel, an individual pump plunger slidably arranged within said individual pump barrel, and an individual work chamber enclosed by said individual pump barrel and said individual pump plunger, common supply means for introducing an amount of fuel to said individual work chambers, individual delivery means each associated with and adapted to receive an amount of fuel from another of said individual work chambers, a common cam shaft, individual cam means arranged on said common cam shaft each associated with and adapted to operate one of said individual pump elements, said individual cam means comprising each an individual suction portion associated with introducing an amount of fuel from said common supply means into said individual work chambers, an individual compression portion associated with displacing an amount of fuel from said individual work chambers into said individual delivery means and an individual delay portion added to said individual compression portions for preventing communication between said common supply means and said individual work chambers, said individual delay portions comprising each an individual relief portion for displacing said individual pump plungers towards said common supply means and thereby reducing the pressure exerted by said individual pump plungers on said individual cam means so as to decrease their load associated with the remainder of said individual delay portions, and control means adapted to adjust the extreme positions of said individual pump plungers with respect to said common cam shaft for reducing the fuel pressure prevailing in said individual delivery means during the displacement of said individual pump plungers entailed by said individual relief portions so as to adjust, in turn, the fuel delivery associated with the full load of the internal combustion engine at a predetermined number of revolutions thereof to a preselected value, said individual suction portions being staggered from each other to extend with respect to said common cam shaft by a central angle having a value of maximum $$\frac{1}{n} \cdot 360°$$

said individual cam means being arranged on said common cam shaft so as to have said individual suction portions rendered mutually staggered by at least the said value of their central angle.

13. A fuel injection pump for internal combustion enbines of the type described, comprising a gang of individual pump elements each having an individual pump barrel, an individual pump plunger slidably arranged within said individual pump barrel, and an individual work chamber enclosed by said individual pump barrel and said individual pump plunger, common supply means for introducing an amount of fuel to said individual work chambers, individual delivery means each associated with and adapted to receive an amount of fuel from another of said individual work chambers, individual tappet means of adjustable axial length for operating each another of said individual pump plungers, a common cam shaft, individual cam means arranged on said common cam shaft each associated with one of and adapted to operate said individual tappet means, and a control system comprising individual control means each associated with one of said pump elements and adapted to adjust the axial length of said individual tappet means, and common control means for selectively operating said individual control means from without for adjusting the axial length of said individual tappet means and thereby reducing the fuel pressure prevailing in said individual delivery means during the suction stroke of said individual pump plungers associated therewith so as to adjust, in turn, the fuel delivery associated with the full load of the internal combustion engine at a predetermined number of revolutions thereof to a preselected value, said individual pump elements and said individual cam means being mutually arranged so as to separate the time period of supplying an amount of fuel to one of said individual work chambers from the time periods of supplying amounts of fuel to the remainder of said individual work chambers and thereby to prevent pressure reaction therebetween through said common supply means.

14. A fuel injection pump for internal combustion engines of the type described, comprising a gang of individual pump elements each having an individual pump barrel, an individual pump plunger slidably arranged within said individual pump barrel, and an individual work chamber enclosed by said individual pump barrel and said individual pump plunger, common supply means for introducing an amount of fuel to said individual work chambers, individual delivery means each associated with and adapted to receive an amount of fuel from another of said individual work chambers, individual tappet means of adjustable axial length for operating each another of said individual pump plungers, a common cam shaft, individual cam means arranged on said common cam shaft each associated with one of and adapted to operate said individual tappet means, and a control system comprising individual control means each associated with one of said individual pump elements and adapted to adjust the axial length of said individual tappet means, and common control means for selectively operating said individual control means and for arresting the non-selected ones, respectively, from without for adjusting the axial length of said individual tappet means and thereby reducing the fuel pressure prevailing in said individual delivery means during the suction stroke of said individual pump plungers associated therewith so as to adjust, in turn, the fuel delivery associated with the full load of the internal combustion engine at a predetermined number of revolutions thereof to a preselected value, said individual pump elements and said individual cam means being mutually arranged so as to separate the time period of supplying an amount of fuel to one of said individual work chambers from the time periods of supplying amounts of fuel to the remainder of said individual work chambers and thereby to prevent pressure reaction therebetween through said common supply means.

15. A fuel injection pump for internal combustion engines of the type described, comprising a gang of individual pump elements each having an individual pump barrel, an individual pump plunger slidably arranged within said individual pump barrel, and an individual work chamber enclosed by said individual pump barrel and said individual pump plunger, common supply means for introducing an amount of fuel to said individual work chambers, individual delivery means each associated with and adapted to receive an amount of fuel from another of said individual work chambers, individual tappet means of adjustable axial length for operating each a different one of said individual pump plungers, a common cam shaft, individual cam means arranged on said common cam shaft each associated with one of said individual tappet means, and a system of control means consisting of common gearing means adapted to be operated from without, individual gearing means each associated with one of said individual tappet means and adapted to adjust the axial length thereof, and individual tooth means arranged on said common gearing means so as to be capable of being selectively engaged with said individual gearing means for adjusting the axial length of said individual tappet means and thereby reducing the fuel pressure prevailing in said individual delivery means during the suction stroke of said individual pump plungers associated therewith so as to adjust, in turn, the fuel delivery associated with the full load of the internal combustion engine at a predetermined number of revolutions thereof to a preselected value, said individual pump elements and said individual cam means being mutually arranged so as to separate the time period of supplying an amount of fuel to one of said individual work chambers from the time periods of supplying amounts of fuel to the remainder of said individual work chambers and thereby to prevent pressure reaction therebetween through said common supply means.

16. A fuel injection pump for internal combustion engines of the type described, comprising a gang of individual pump elements each having an individual pump barrel, an individual pump plunger slidably arranged within said individual pump barrel, and an individual work chamber enclosed by said individual pump barrel and said individual pump plunger, common supply means for introducing an amount of fuel to said individual work chambers, individual delivery means each associated with and adapted to receive an amount of fuel from another of said individual work chambers, individual tappet means of adjustable axial length for operating each a different one of said individual pump plungers, a common cam shaft, individual cam means arranged on said common cam shaft each associated with one of and adapted to operate said individual tappet means, and a system of control means consisting of rotatable and axially shiftable common toothed rack means adapted to be operated from without, individual pinions each associated with one of said individual tappet means and adapted to adjust the axial length thereof upon rotation, first individual groups of teeth supported by said common toothed rack means in mutually aligned axial relationship, second individual groups of teeth supported by said common toothed rack means in mutually staggered axial relationship, said first individual groups of teeth being adapted to be simultaneously engaged with said individual pinions upon rotation of said common toothed rack means, said second individual groups of teeth being adapted to be selectively engaged with said individual pinions upon rotation of said common toothed rack means, said individual pinions being adapted to be turned upon axial displacement of said common toothed rack means for adjusting the axial length of said individual tappet means and thereby reducing the fuel pressure prevailing in said individual delivery means during the suction stroke of said individual pump plungers associated therewith so as to adjust, in turn, the fuel delivery associated with the full load of the internal combustion engine at a predetermined number of revolutions thereof to a preselected value, said individual pump elements and said individual cam means being mutually arranged so as to separate the time period of supplying an amount of fuel to one of said individual work chambers from the time periods of supplying amounts of fuel to the remainder of said individual work chambers and thereby to prevent pressure reaction therebetween through said common supply means.

17. A fuel injection pump for internal combustion engines of the type described, comprising a gang of individual pump elements each having an individual pump barrel, an individual pump plunger slidably arranged within said individual pump barrel, and an individual work chamber enclosed by said individual pump barrel and said individual pump plunger, common supply means for introducing an amount of fuel to said individual work chambers, individual delivery means each associated with and adapted to receive an amount of fuel from another of said individual work chambers, individual tappet means of adjustable axial length for operating each a different one of said individual pump plungers, a common cam shaft, individual cam means arranged on said common cam shaft each associated with one of said individual tappet means, and a system of control means consisting of rotatable and axially shiftable first common toothed rack means adapted to be operated from without, first individual groups of teeth supported by said first common toothed rack means in mutually aligned axial relationship, second individual groups of teeth supported by said first common toothed rack means in mutually staggered axial relationship, rotatable second common toothed rack means, gearing means for positively transmitting rotational motion from said first common toothed rack means to said second common toothed rack means, third individual groups of teeth supported by said second common toothed rack means in mutually staggered axial relationship, individual pinions each associated with one of said individual tappet means and adapted to adjust the axial length thereof, said first individual groups of teeth being adapted to be simultaneously engaged with said individual pinions upon rotation of said first common toothed rack means, said second individual groups of teeth being adapted to be selectively engaged with said individual pinions upon rotation of said first common toothed rack means, said third individual groups of teeth being adapted to be individually engaged with said individual pinions upon rotation of said first common toothed rack means, said first and second individual groups of teeth and said third individual groups of teeth being in complementary mutual relationship as regards said first common toothed rack means and said second common toothed rack means so as to have said individual pinions when being selectively engaged with said first and second individual groups of teeth, respectively, be disengaged with said third individual groups of teeth and the non-selected ones of said individual pinions be engaged with and arrested by said third individual groups of teeth, said individual pinions being adapted to be turned upon axial displacement of said first common toothed rack means for adjusting the axial length of said individual tappet means and thereby reducing the fuel pressure prevailing in said individual delivery means during the suction stroke of said individual pump plungers associated therewith so as to adjust, in turn, the fuel delivery associated with the full load of the internal combustion engine at a predetermined number of revolutions thereof to a preselected value, said individual pump elements and said individual cam means being mutually arranged so as to separate the time period of supplying an amount of fuel to one of said individual work chambers from the time periods of supplying amounts of fuel to the remainder of said individual work chambers and thereby to prevent pressure reaction therebetween through said common supply means.

References Cited in the file of this patent

UNITED STATES PATENTS

| 1,613,854 | St. Clair | Jan. 11, 1927 |
| 1,900,385 | Kehr | Mar. 7, 1933 |
| 2,029,941 | Pokorney | Feb. 4, 1936 |
| 2,090,781 | Camner | Aug. 24, 1937 |
| 2,099,206 | Hedblom | Nov. 16, 1937 |
| 2,130,521 | Brunner | Sept. 20, 1938 |
| 2,247,421 | Tabb et al. | July 1, 1941 |
| 2,296,357 | Links et al. | Sept. 22, 1942 |
| 2,374,614 | Nichols | Apr. 24, 1945 |
| 2,465,784 | Berlyn et al. | Mar. 29, 1949 |
| 2,545,664 | Johnson | Mar. 20, 1951 |

FOREIGN PATENTS

| 746,867 | Germany | Aug. 28, 1944 |